United States Patent
Dunbar et al.

(10) Patent No.: US 10,681,867 B2
(45) Date of Patent: Jun. 16, 2020

(54) ZERO TURNING RADIUS MOWER PARK BRAKE SYSTEM

(71) Applicant: DEERE & COMPANY, Moline, IL (US)

(72) Inventors: Robert D. Dunbar, Holly Springs, NC (US); Jaimie Pelino, Raleigh, NC (US); Frank M. Welz, Beaver Dam, WI (US)

(73) Assignee: DEERE & COMPANY, Moline, IL (US)

( * ) Notice: Subject to any disclaimer, the term of this patent is extended or adjusted under 35 U.S.C. 154(b) by 145 days.

(21) Appl. No.: 15/915,574

(22) Filed: Mar. 8, 2018

(65) Prior Publication Data

US 2019/0274251 A1 Sep. 12, 2019

(51) Int. Cl.
| | | |
|---|---|---|
| *B62D 11/02* | (2006.01) | |
| *A01D 69/10* | (2006.01) | |
| *B60T 7/10* | (2006.01) | |
| *A01D 34/66* | (2006.01) | |
| *A01D 34/82* | (2006.01) | |
| *B60T 11/04* | (2006.01) | |
| *B60T 11/21* | (2006.01) | |
| *A01D 101/00* | (2006.01) | |

(52) U.S. Cl.
CPC .............. *A01D 69/10* (2013.01); *A01D 34/66* (2013.01); *A01D 34/824* (2013.01); *B60T 7/102* (2013.01); *B60T 7/108* (2013.01); *B60T 11/046* (2013.01); *B60T 11/21* (2013.01); *A01D 2101/00* (2013.01)

(58) Field of Classification Search
CPC ........ A01D 69/10; A01D 34/64; A01D 34/66; B60T 7/10; B60T 7/102; B60T 7/108; B60T 11/046; B62D 11/02

USPC ............... 56/11.3–11.9; 188/2 D; 192/224.1, 192/224.2
See application file for complete search history.

(56) References Cited

U.S. PATENT DOCUMENTS

| | | | |
|---|---|---|---|
| 6,056,074 A | 5/2000 | Heal et al. | |
| 6,301,864 B1 * | 10/2001 | Damie | A01D 34/6812 56/11.3 |
| 6,434,917 B1 | 8/2002 | Bartel | |
| 6,708,805 B2 * | 3/2004 | Samejima | B60T 7/02 180/6.34 |
| 6,729,115 B2 * | 5/2004 | Bartel | A01D 34/69 180/286 |
| 6,739,116 B2 | 5/2004 | Stover et al. | |
| 6,886,677 B2 | 5/2005 | Rupiper et al. | |
| 7,299,610 B2 | 11/2007 | Piontek | |
| 7,340,890 B1 | 3/2008 | Poplawski et al. | |
| 7,451,865 B2 | 11/2008 | Eavenson, Sr. et al. | |
| 7,458,432 B2 | 12/2008 | Mayer et al. | |
| 7,634,953 B2 | 12/2009 | Hoffman et al. | |

(Continued)

*Primary Examiner* — Christopher P Schwartz

(57) ABSTRACT

A zero turning radius mower park brake system includes an over-center pivot member that pivots to a park brake engaged position in response to moving a control arm fully outward, and to a park brake disengaged position in response to moving the control arm fully inward. The control arm is disconnected from the over-center pivot member in the park brake engaged and disengaged positions. An actuator on a lower end of the control arm may contact the over-center pivot member between the park brake engaged and disengaged positions. A biasing spring urges the over-center pivot member to the park brake engaged position and park brake disengaged position.

15 Claims, 5 Drawing Sheets

(56) References Cited

U.S. PATENT DOCUMENTS

| | | | |
|---|---|---|---|
| 7,677,371 B2 | 3/2010 | Dong et al. | |
| 7,686,108 B2 * | 3/2010 | Piontek | A01D 34/64 |
| | | | 180/6.2 |
| 8,235,151 B2 | 8/2012 | Nunez et al. | |
| 8,240,420 B1 | 8/2012 | Bartel et al. | |
| 8,323,153 B2 | 12/2012 | Deblack et al. | |
| 8,573,368 B2 | 11/2013 | Stover et al. | |
| 8,857,558 B2 | 10/2014 | Poe | |
| 9,313,953 B2 | 4/2016 | Borshov et al. | |
| 9,650,024 B2 | 5/2017 | Weihl | |
| 2008/0296107 A1 * | 12/2008 | Porter | A01D 34/82 |
| | | | 188/2 D |
| 2012/0241263 A1 * | 9/2012 | Stover | A01D 69/10 |
| | | | 188/156 |

* cited by examiner

ZERO TURNING RADIUS MOWER PARK BRAKE SYSTEM

FIELD OF THE INVENTION

This invention relates to grass mowing machines, and specifically to zero turning radius ("ZTR") mowers having independently powered left and right drive wheels controlled by a pair of steering arms.

BACKGROUND OF THE INVENTION

Grass mowing machines known as zero turning radius ("ZTR") mowers have at least one independently powered drive wheel on each side of a frame. One drive wheel may be operated in a forward direction while the other drive wheel may be stopped or operated in reverse. Many ZTR mowers have a twin stick control system. A pair of steering arms or control levers may be provided side-by-side, with each steering arm controlling one of the drive wheels. When both steering arms or control levers are advanced together forwardly out of their neutral position, both drive wheels rotate forwardly to cause the mower to move forward. A ZTR mower may be steered by advancing one steering arm or control lever more than the other.

Typically, each steering arm or control lever on a ZTR mower may be linked to a pump arm of one of two separate hydraulic pumps, or of a dual hydraulic pump; i.e., a separate pump for each wheel. The steering arm or control lever may be used to move a pump swash plate through a direct linkage.

The steering arms or control levers on a ZTR mower may be mounted on the vehicle frame so that each has a first pivot axis allowing the steering arm or control lever in the operating position to pivot forwardly in an arc to turn the wheel in forward, or pivot rearwardly to turn the wheel in reverse. Additionally, when a steering arm or control lever is in neutral, between forward and reverse, the operator may pivot it outwardly on a second pivot axis. The ZTR mower may stay in neutral when the steering arms or control levers are pivoted outward.

Some ZTR mowers have mechanisms to engage park brakes when the steering arms or control levers are pivoted outward. For example, U.S. Pat. Nos. 6,434,917 and 6,729,115 for Mower with Combined Steering and Brake Levers relates to linkages connected between each steering lever and brake mechanism, which engages or releases a park brake when the steering lever is moved laterally outward from then neutral position. U.S. Pat. No. 6,739,116 for Powered Actuator System for Mower Parking Brake System relates to an electrically powered actuator system that includes a solenoid that may be de-energized or energized to engage or disengage the parking brake. U.S. Pat. No. 7,677,371 for Mower With Automatic Parking Brake relates to a hydraulic parking brake actuator that senses the position of the steering lever and controls a valve for high pressure fluid to flow to the actuator to disengage the parking brake. U.S. Pat. No. 7,686,108 for Electrically Released parking Brake for Zero Turn Radius Mower relates to switches that allow air cylinders to exhaust pressurized air so that tension springs may actuate the brakes. U.S. Pat. No. 8,240,420 for Steering Mechanism relates to a sensor for activating parking brakes for sensing the lever assembly when it is in the outboard position. U.S. Pat. No. 8,573,368 for Motor Driven Parking Brake Actuator System for Mower relates to an electric motor that drives a gear reduction assembly rotating an output shaft linked to the parking brakes. U.S. Pat. No. 9,313,953 for Parking Brake System for a Lap Bar Controlled Zero Turn Radius Mower relates to an actuation assembly with a rotatable push arm connected to the lower end of each lap bar, and is spaced apart from a rotatable pedal arm in a disengaged position, and in contact in an engaged position.

SUMMARY OF THE INVENTION

A zero turning radius mower park brake system includes an over-center pivot member connected by a cable to a park brake. An actuator may be provided at a lower end of a pivotable steering arm bracket. The actuator urges the over-center pivot member to a park brake engaged position when the steering arm bracket is pivoted outwardly, and to a park brake disengaged position when the steering arm bracket is pivoted inwardly. The actuator is spaced from the over-center pivot member at each of the park brake engaged position and park brake disengaged position.

DESCRIPTION OF THE PREFERRED EMBODIMENT

Figure 1:
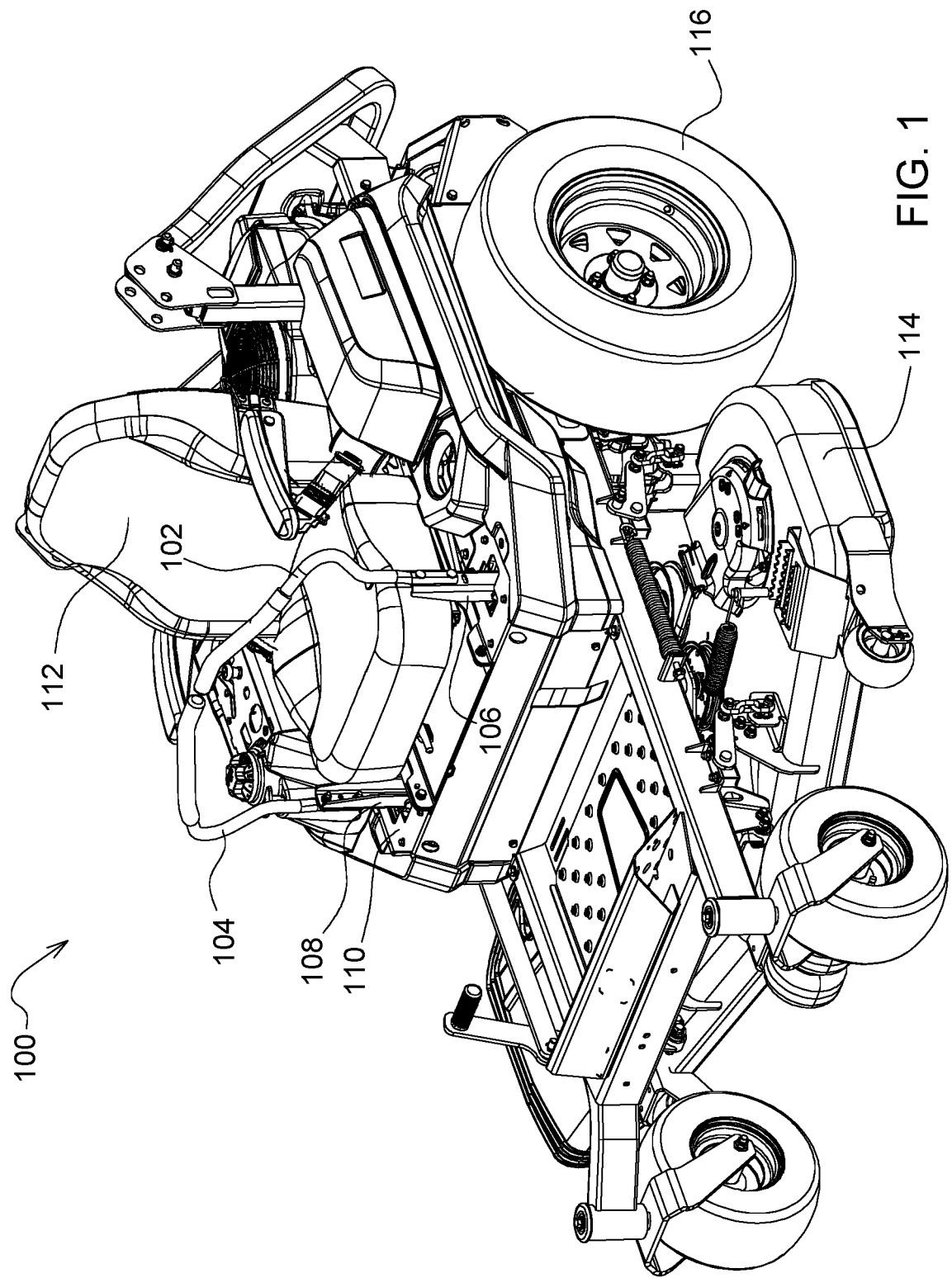
FIG. 1 is a perspective view of a ZTR mower with a zero turning radius mower park brake system according to a first embodiment of the invention.
Figure 2:
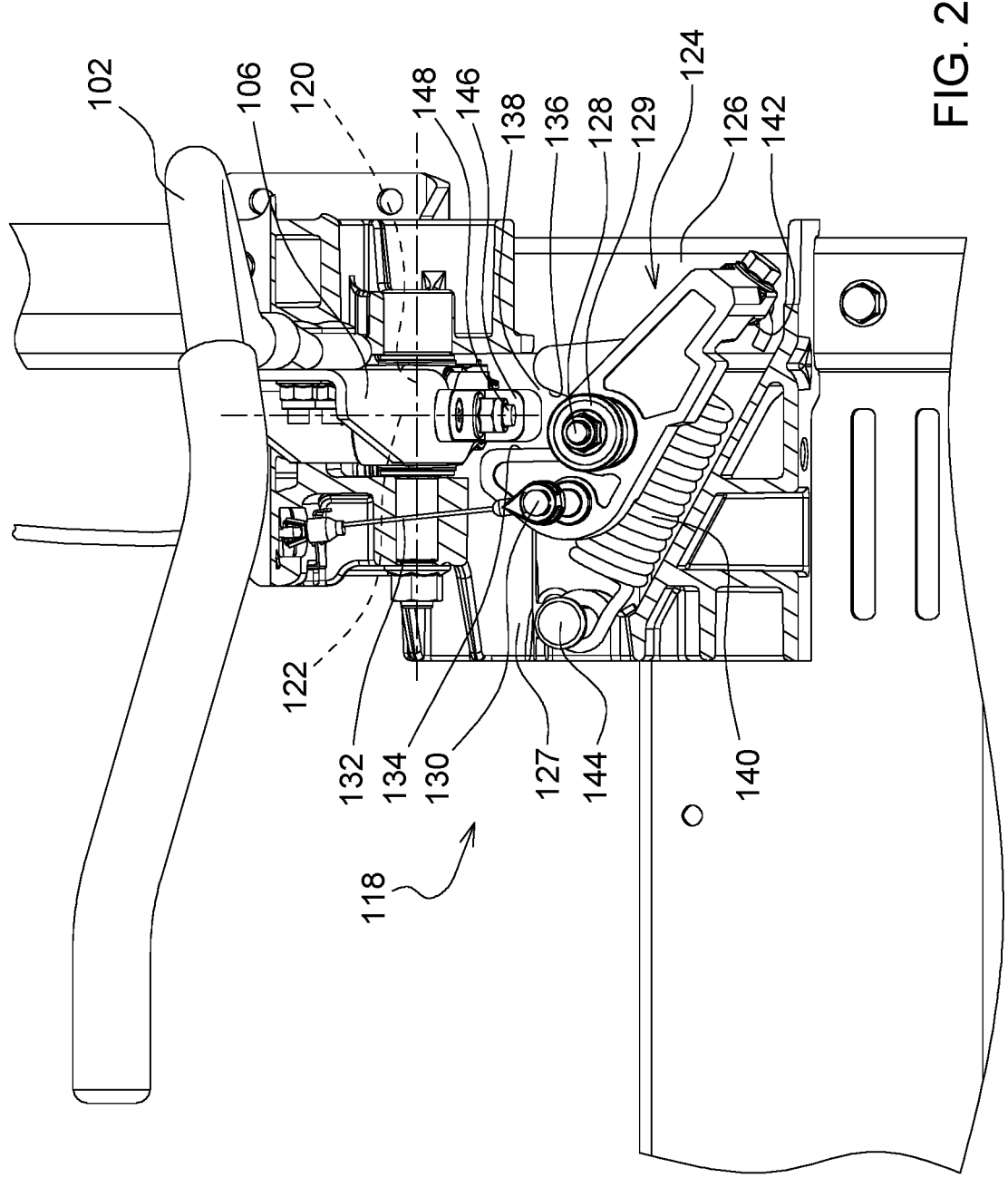
FIG. 2 is a top view of a zero turning radius mower park brake system according to a first embodiment of the invention with the park brake disengaged.
Figure 3:
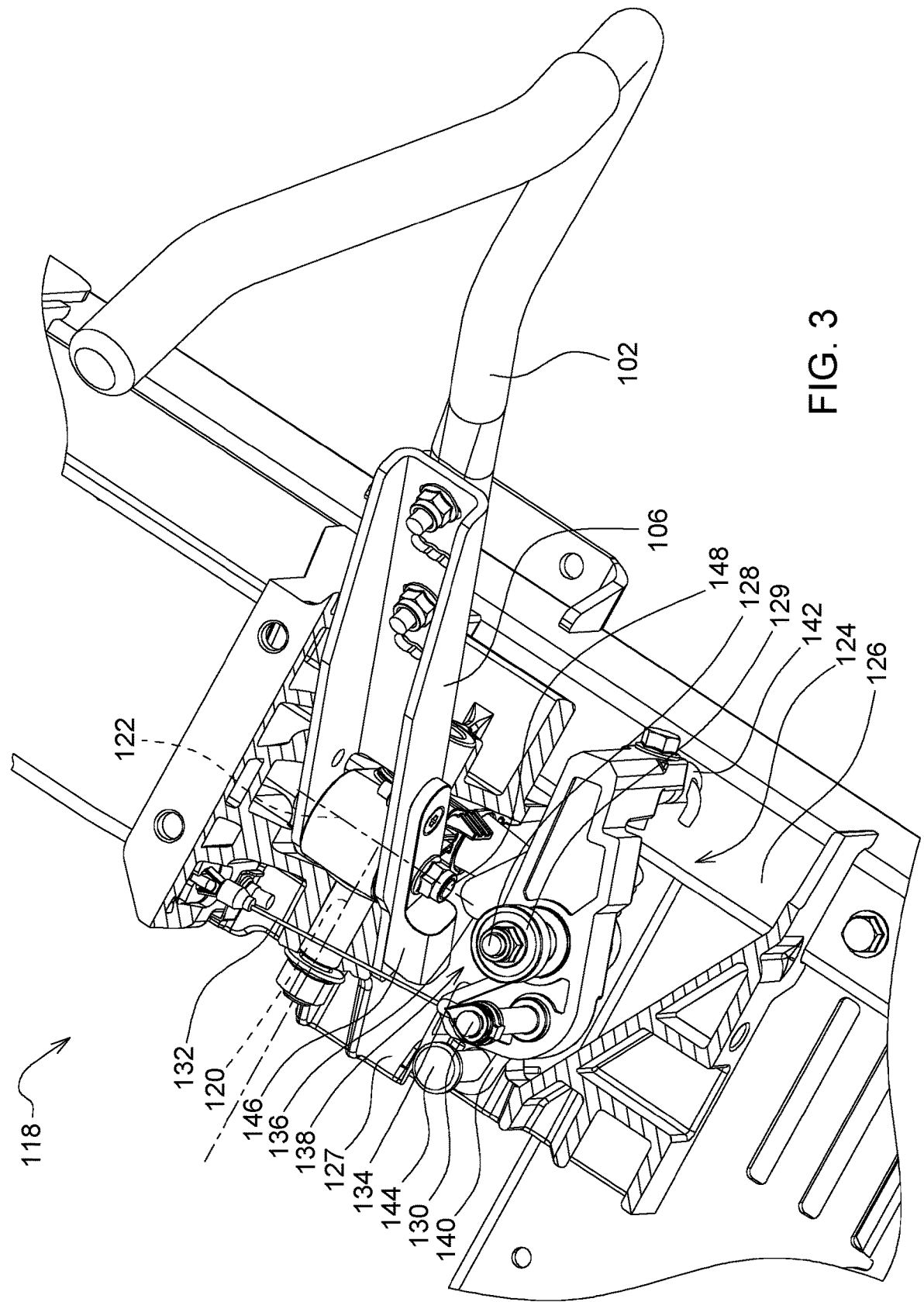
FIG. 3 is a top view of a zero turning radius mower park brake system according to a first embodiment of the invention with the park brake engaged.

In a first embodiment of the invention shown in FIGS. 1-3, zero turning radius mower park brake system 118 may be provided on ZTR mower 100 having a pair of steering arms or control levers 102, 104. Each steering arm or control lever may be attached to a steering arm bracket 106, 108 which may be pivotably mounted to operator platform 110 alongside operator seat 112. For example, the pair of steering arm brackets may be pivotably mounted to an operator platform as described in U.S. Pat. No. 9,510,503 for Grass Mowing Machine Operator Platform owned by Deere & Company, or a similar structure. The ZTR mower also may have a rear mounted engine behind the operator platform, and a mower deck 114 mounted below and forwardly of the operator platform. Each steering arm or control lever may be used to control one of rear drive wheels 116.

It will be understood that the same or essentially the same zero turning radius mower park brake system 118 may be provided for each steering arm or control lever, but only a zero turning radius mower park brake system for steering arm or control lever 102 is shown in FIGS. 2 and 3. The lower end of steering arm or control lever 102 may be attached to steering bracket 106, which may be pivotably mounted to first steering pivot 120, so that the steering arm or control lever may be pivoted forward to a maximum angle of about 20 degrees from neutral to move a swash plate in a hydrostatic pump in a first direction to cause a rear drive wheel to rotate forward, and rearward to a maximum angle of about 10 degrees from neutral to move the swash plate in a second direction to cause the rear drive wheel to rotate backward. The mounting arrangement for steering arm bracket 106 also may include second steering pivot 122 which enables steering arm or control lever 102 to pivot laterally outwardly from the neutral position shown in FIG. 2, to the laterally outward position shown in FIG. 3, which may have a maximum angle of about 36 degrees, to improve operator access to or from the operator's seat. The axis of the second steering pivot may be perpendicular to the axis of the first steering pivot.

In one embodiment shown in FIGS. 2 and 3, zero turning radius mower park brake system 118 may include over-center pivot member 124 mounted to operator platform 110 or to a frame member 126 or support structure 127 on the ZTR mower adjacent the lower end of the steering arm or control lever. The over-center pivot member may be pivotably mounted on vertical pivot axis 128 next to the lower end of steering arm bracket 106, and is not connected or linked to the steering arm bracket. The over-center pivot member may pivot on vertical pivot axis 128 about 50 degrees between a park brake disengaged position shown in FIG. 2, and a park brake engaged position shown in FIG. 3. One or more washers, bearings or bushings 129 may be positioned between the over-center pivot member and the vertical pivot axis on the operator platform, frame member or support structure. Pin 130 also may be provided on the over-center pivot member at a location spaced radially outward from vertical pivot axis 128, and may be connected by park brake cable 132 or a similar linkage to a park brake for rear drive wheel 116.

In one embodiment, over-center pivot member 124 may be a generally claw-shaped metal casting or injection molded plastic component having first and second fingers 134, 136. Alternatively, the over-center pivot member may be a sheet metal weldment having a pair of tabs instead of fingers. The over-center pivot member may include a gap or opening 138 between the pair of fingers or tabs. Biasing spring 140 may provide a force tending to urge over-center pivot member 124 to a first over-center position shown in FIG. 2, in which the park brake is disengaged, and to a second over-center position shown in FIG. 3, in which the park brake is engaged. The over-center pivot member may contact a first rotation stop in the disengaged position, and a second rotation stop in the engaged position. The biasing spring may be a tension spring or compression spring providing a force tending to hold the over-center pivot member at either the first over-center position or the second over-center position. To move the over-center pivot member between the first and second over-center positions, the over-center pivot member must move past a center position. Biasing spring 140 preferably may be a coil spring having a first end connected to pin 142 at one end of the over-center pivot member, and a second end connected to pin 144 on the operator platform, frame member or support structure.

In one embodiment, zero turning radius mower park brake system 118 may include actuator 146 mounted to the lower end of steering arm bracket 106, or to the lower end of the steering arm or control lever. The actuator may be attached to the steering arm bracket with one or more threaded fasteners 148, or may be welded or integrally formed as part of the steering arm bracket. The actuator may have a thickness or width that is less than gap or opening 138 of the over-center pivot member, so that the actuator does not contact either finger or tab of the over-center pivot member in the first over-center position shown in FIG. 2, in which the park brake is disengaged, or the second over-center position shown in FIG. 3, in which the park brake is engaged. The actuator, however, may briefly contact and move the over-center pivot member as the operator pivots the steering arm or control lever 102 inwardly and outwardly between the two positions. The actuator may be located in the gap or opening 138 of the over-center pivot member once the steering arms or control levers have reached their fully inward or outward positions. As a result, the steering arms or control levers are not connected to the park brake system when they are fully inward or outward.

In one embodiment, an operator may use zero turn mower park brake system 118 to engage the park brake by pivoting steering arm or control lever 102 outwardly. For example, the operator may pivot the steering arm or control lever outwardly about 15 degrees before actuator 146 contacts finger 134 on over-center pivot member 124. The operator may continue pivoting the steering arm or control lever outwardly while actuator 146 is in contact or engagement with finger 134, pivoting the over-center pivot member about 33 degrees away from the first over-center position. When the operator moves steering arm or control lever 102 to its fully outward position, which may be about 20 degrees after actuator 146 first engages the over-center pivot member, the actuator may disengage and cease contact with the over-center pivot member, and spring 140 may urge the over-center pivot member about 17 more degrees to the second over-center position and pull cable 132 sufficiently to engage the park brake.

In one embodiment, the operator may use ZTR mower park brake system 118 to disengage the park brake by pivoting the steering arm or control lever 102 inwardly. For example, the operator may pivot the steering arm or control lever inwardly about 4 degrees inwardly before actuator 146 contacts or engages finger 136 on the over-center pivot member. The operator may continue pivoting the steering arm or control lever inwardly while the actuator is in contact or engagement with the over-center pivot member, pivoting the over-center pivot member about 33 degrees away from the second over-center position. When the operator moves the steering arm or control lever to its fully inward position, which may be about 32 degrees after the actuator first engages finger 136, the actuator may disengage the over-center pivot member, and spring 140 may urge the over-center pivot member about 17 more degrees to the first over-center position to reduce tension of cable 132 sufficiently to disengage the park brake. Once the park brake is disengaged, the operator may move the steering arm or control lever fore and aft during normal steering operation, without engaging, contacting or interfering with the over-center pivot member or park brake.

Figure 4:
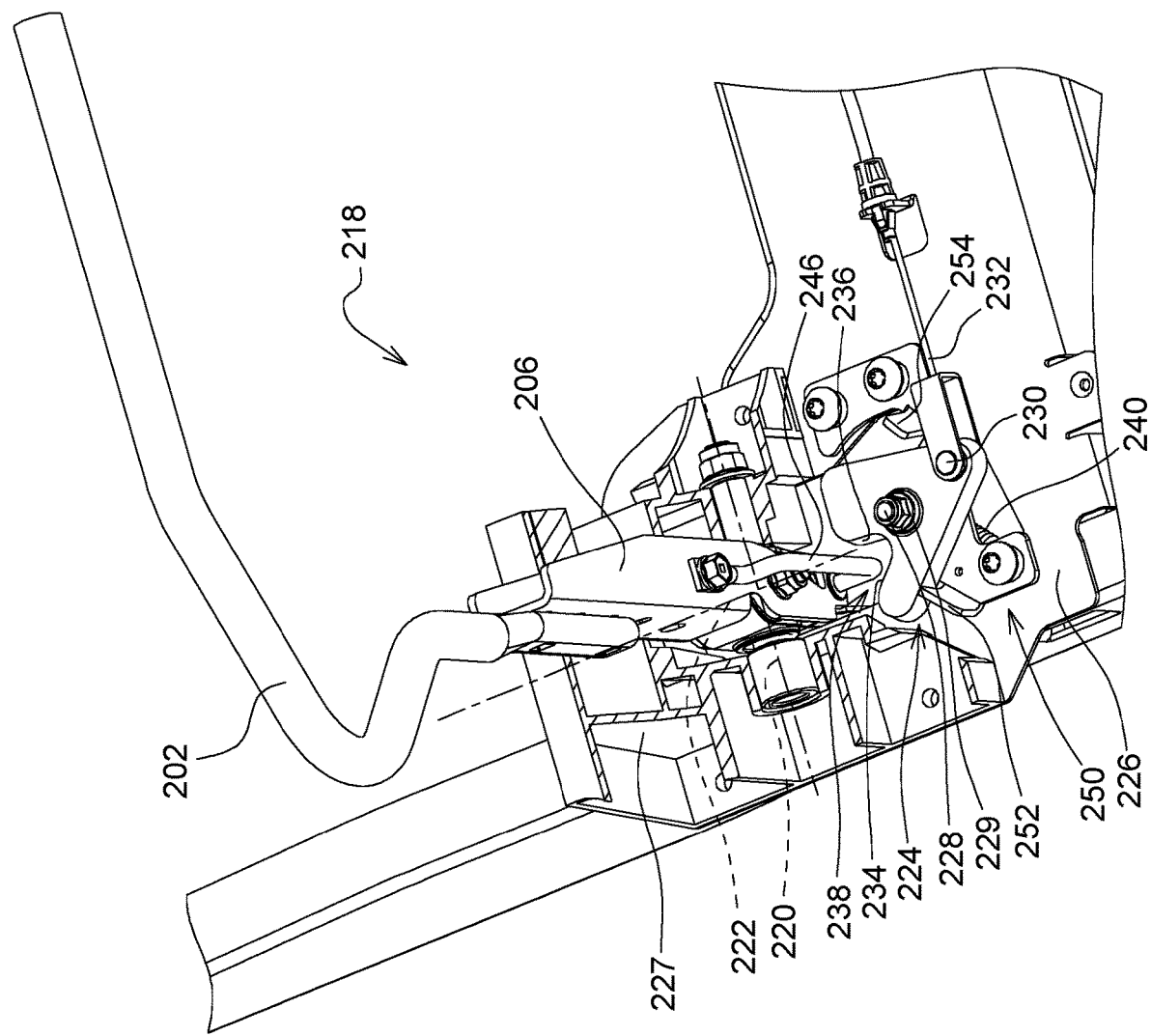
FIG. 4 is a top view of a zero turning radius mower park brake system according to a second embodiment of the invention with the park brake disengaged.
Figure 5:
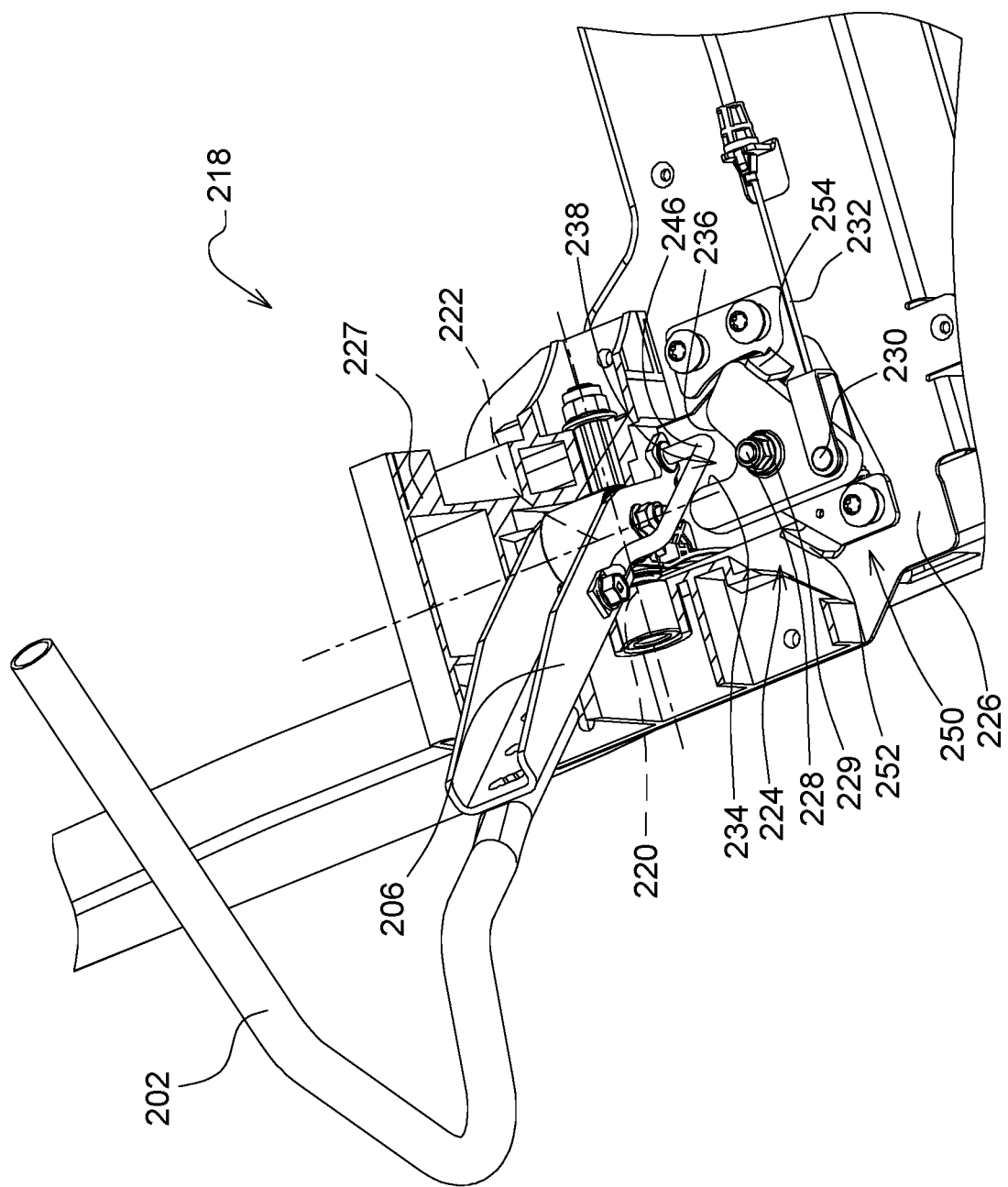
FIG. 5 is a top view of a zero turning radius mower park brake system according to a second embodiment of the invention with the park brake engaged.

In a second embodiment shown in FIGS. 4 and 5, the lower end of steering arm or control lever 202 may be attached to steering bracket 206, which may be pivotably mounted to first steering pivot 220, so that the steering arm or control lever may be pivoted forward to a maximum angle of about 20 degrees from neutral to move a swash plate in a hydrostatic pump in a first direction to cause a rear drive wheel to rotate forward, and rearward to a maximum angle of about 10 degrees from neutral to move the swash plate in a second direction to cause the rear drive wheel to rotate backward. The mounting arrangement for steering arm bracket 206 also may include second steering pivot 222 which enables steering arm or control lever 202 to pivot laterally outwardly from the neutral position shown in FIG. 4, to the laterally outward position shown in FIG. 5, which may have a maximum angle of about 30 to 40 degrees, to improve operator access to or from the operator's seat.

In a second embodiment shown in FIGS. 4 and 5, zero turning radius mower park brake system 218 may include over-center pivot member 224 pivotably mounted to bracket 250 attached to the operator platform or to a frame member 226 or support structure 227 on the ZTR mower adjacent the lower end of the steering arm or control lever. The over-center pivot member may be pivotably mounted on vertical pivot axis 228 next to the lower end of steering arm bracket 206, and is not connected to the steering arm bracket. The over-center pivot member may pivot on vertical pivot axis 228 about 40 to 50 degrees between a park brake disengaged position shown in FIG. 4, and a park brake engaged position shown in FIG. 5. Rotation stops 252 and 254 also may be provided on bracket 250 to stop rotation of the over-center pivot member at the park brake engaged and disengaged positions. One or more washers, bearings or bushings 229 may be positioned between the over-center pivot member and the vertical pivot axis on the operator platform, frame member or support structure. Pin 230 also may be provided on the over-center pivot member at a location spaced radially outward from the vertical pivot axis, and may be connected by park brake cable 232 or another linkage to a park brake for a rear drive wheel.

In a second embodiment, over-center pivot member 224 may be a generally V-shaped casting having first and second lobes 234, 236. The over-center pivot member may include a gap or opening 238 between the pair of lobes. Biasing spring 240 may provide a force tending to urge over-center pivot member 224 to a first over-center position shown in FIG. 4, in which the park brake is disengaged, and to a second over-center position shown in FIG. 5, in which the park brake is engaged. The biasing spring also may provide a force tending to hold the over-center pivot member at either the first over-center position or the second over-center position. To move the over-center pivot member between the first and second over-center positions, it must pass a center position. Biasing spring 240 preferably may be a tension or compression spring extending between one end of the over-center pivot member at a location displaced radially outwardly from the vertical pivot axis, and pin 244 on the operator platform, frame member or support structure.

In a second embodiment, zero turning radius mower park brake system 218 may include actuator 246 mounted with one or more threaded fasteners 248 to the lower end of steering arm bracket 206, or the lower end of the steering arm or control lever. The actuator may have a thickness or width that is less than gap or opening 238 of the over-center pivot member. For example, the actuator may be a wire form. Actuator 246 may contact over-center pivot member 224 as the operator pivots the steering arm or control lever 102 inwardly and outwardly, but does not contact or engage the over-center pivot member at the first over-center position shown in FIG. 4, in which the park brake is disengaged, or the second over-center position shown in FIG. 5, in which the park brake is engaged. Instead, actuator 246 may be located in the gap or opening 238 of the over-center pivot member when the steering arms or control levers are at their fully inward or outward positions. The steering arms or control levers are not connected to the park brake system when they are fully inward or outward.

In a second embodiment, an operator may use zero turn mower park brake system 218 to engage the park brake by pivoting steering arm or control lever 202 outwardly. For example, the operator may pivot the steering arm or control lever outwardly about 15 degrees before actuator 246 contacts finger 234 on over-center pivot member 224. The operator may continue pivoting the steering arm or control lever outwardly while actuator 246 is in contact or engagement with finger 234, pivoting the over-center pivot member about 33 degrees away from the first over-center position. When the operator moves steering arm or control lever 202 to its fully outward position, which may be about 20 degrees after actuator 246 first engaged the over-center pivot member, the actuator may disengage and come out of contact with the over-center pivot member, and spring 240 may urge the over-center pivot member about 5 to 10 more degrees to the second over-center position and pull cable 232 sufficiently to engage the park brake.

In the second embodiment, the operator may use ZTR mower park brake system 218 to disengage the park brake by pivoting the steering arm or control lever 202 inwardly. For example, the operator may pivot the steering arm or control lever inwardly about 4 degrees before actuator 246 contacts or engages finger 236 on the over-center pivot member. The operator may continue pivoting the steering arm or control lever inwardly while the actuator is in contact or engagement with the over-center pivot member, pivoting the over-center pivot member about 33 degrees away from the second over-center position. When the operator moves the steering arm or control lever to its fully inward position, which may be about 30 to 40 degrees after the actuator first engaged finger 236, the actuator may disengage the over-center pivot member, and spring 240 may urge the over-center pivot member about 5 to 10 more degrees to the first over-center position to reduce tension of cable 232 sufficiently to disengage the park brake. Once the park brake is disengaged, the operator may move the steering arm or control lever fore and aft during normal steering operation, without engaging, contacting or interfering with the over-center pivot member or park brake.

Having described the preferred embodiments, it will become apparent that various modifications can be made without departing from the scope of the invention as defined in the accompanying claims.

The invention claimed is:

1. A zero turning radius mower park brake system, comprising:
   an over-center pivot member pivoting to a park brake engaged position in response to moving a control arm fully outward, and to a park brake disengaged position in response to moving the control arm fully inward; the control arm disconnecting from the over-center pivot member in the park brake engaged and disengaged positions.

2. The zero turning radius mower park brake system of claim 1 further comprising an actuator on a lower end of the control arm that contacts the over-center pivot member between the park brake engaged and disengaged positions.

3. The zero turning radius mower park brake system of claim 1 further comprising a biasing spring connected to the over-center pivot member and urging the over-center pivot member to the park brake engaged position and park brake disengaged position.

4. The zero turning radius mower park brake system of claim 1 further including a pair of stops contacted by the over-center pivot member at the park brake engaged and disengaged positions.

5. A zero turning radius mower park brake system, comprising:
   at least one over-center pivot member mounted to a zero turning radius mower adjacent the lower end of at least one control lever; the over-center pivot member connected to a park brake for a drive wheel, and being spring biased to a first position where the park brake is disengaged or a second position where the park brake is engaged; the each control lever contacting disconnected from the over-center pivot member and then parting from the over-center pivot member at the first position or the second position.

6. The zero turning radius mower park brake system of claim 5 further comprising a coil spring that urges each over-center pivot member to the first position or the second position.

7. The zero turning radius mower park brake system of claim 5 wherein each over-center pivot member is connected to one of the park brakes with a cable.

8. A zero turning radius mower park brake system, comprising:
   an over-center pivot member connected to a park brake;
   an actuator at a lower end of a pivotable steering arm bracket; the actuator briefly contacting the over-center pivot member to a park brake engaged position when the steering arm bracket is pivoted outwardly, and to a park brake disengaged position when the steering arm bracket is pivoted inwardly; the actuator being spaced from the over-center pivot member at each of the park brake engaged position and park brake disengaged position.

9. The zero turning radius mower park brake system of claim 8 further comprising a spring biasing the over-center pivot member to the park brake engaged and disengaged positions.

10. A zero turning radius mower park brake system, comprising:
    an over-center pivot member connected to a park brake;
    an actuator at a lower end of a pivotable steering arm bracket; the actuator urging the over-center pivot member to a park brake engaged position when the steering arm bracket is pivoted outwardly, and to a park brake disengaged position when the steering arm bracket is pivoted inwardly; the actuator being spaced from the over-center pivot member at each of the park brake engaged position and park brake disengaged position;
    wherein the over-center pivot member is claw-shaped having a pair of fingers with a gap therebetween.

11. The zero turning radius mower park brake system of claim 10 wherein the actuator is a wire form.

12. The A zero turning radius mower park brake system, comprising:
    an over-center pivot member connected to a park brake;
    an actuator at a lower end of a pivotable steering arm bracket; the actuator urging the over-center pivot member to a park brake engaged position when the steering arm bracket is pivoted outwardly, and to a park brake disengaged position when the steering arm bracket is pivoted inwardly; the actuator being spaced from the over-center pivot member at each of the park brake engaged position and park brake disengaged position;
    wherein the over-center pivot member has a vertical pivot axis.

13. A zero turning radius mower park brake system, comprising:
    at least one over-center pivot member mounted to a zero turning radius mower adjacent the lower end of at least one control lever; each over-center pivot member connected to a park brake for a drive wheel, and being spring biased to a first position where the park brake is disengaged or a second position where the park brake is engaged; each control lever disconnected from the over-center pivot member and when the over-center pivot member reaches the first position or the second position;
    wherein each over-center pivot member is claw-shaped having a pair of fingers and an opening or gap therebetween.

14. A zero turning radius mower park brake system, comprising:
    an over-center pivot member pivoting to a park brake engaged position in response to moving a control arm fully outward, and to a park brake disengaged position in response to moving the control arm fully inward; the control arm being disconnected from the over-center pivot member in the park brake engaged and disengaged positions;
    wherein the over-center pivot member includes a pair of lobes with a gap therebetween.

15. A zero turning radius mower park brake system, comprising:
    an over-center pivot member pivoting to a park brake engaged position in response to moving a control arm fully outward, and to a park brake disengaged position in response to moving the control arm fully inward; the control arm being disconnected from the over-center pivot member in the park brake engaged and disengaged positions;
    wherein the over-center pivot member includes a pair of fingers with a gap therebetween.

* * * * *